(12) United States Patent
Gleeson et al.

(10) Patent No.: US 12,247,174 B2
(45) Date of Patent: Mar. 11, 2025

(54) WAX AND LUBE BASE STOCK PRODUCTS USING SHAPE SELECTIVE MEMBRANE SEPARATION

(71) Applicant: EXXONMOBIL TECHNOLOGY AND ENGINEERING COMPANY, Annandale, NJ (US)

(72) Inventors: James W. Gleeson, Magnolia, TX (US); Benjamin S. Umansky, Fairfax, VA (US); Kendall S. Fruchey, Humble, TX (US)

(73) Assignee: Exxon Mobil Technology and Engineering Company, Spring, TX (US)

( * ) Notice: Subject to any disclaimer, the term of this patent is extended or adjusted under 35 U.S.C. 154(b) by 115 days.

(21) Appl. No.: 17/922,441

(22) PCT Filed: Mar. 29, 2021

(86) PCT No.: PCT/US2021/024550
§ 371 (c)(1),
(2) Date: Oct. 31, 2022

(87) PCT Pub. No.: WO2021/230985
PCT Pub. Date: Nov. 18, 2021

(65) Prior Publication Data
US 2023/0212468 A1 Jul. 6, 2023

Related U.S. Application Data

(60) Provisional application No. 63/023,289, filed on May 12, 2020.

(51) Int. Cl.
*C10G 73/02* (2006.01)
*B01D 69/02* (2006.01)
(Continued)

(52) U.S. Cl.
CPC ........... *C10G 73/025* (2013.01); *B01D 69/02* (2013.01); *B01D 69/04* (2013.01); *B01D 69/108* (2022.08);
(Continued)

(58) Field of Classification Search
CPC .... B01D 71/0281; B01D 69/02; B01D 69/04; B01D 69/108; C10G 31/09; C10G 73/025; C10G 67/02
See application file for complete search history.

(56) References Cited

U.S. PATENT DOCUMENTS

2006/0090651 A1* 5/2006 Liu .................. C01B 3/505
96/121
2014/0360938 A1* 12/2014 Hayashi ............. B01D 67/0051
210/500.25
2019/0390129 A1* 12/2019 McCool ............. B01D 67/0023

FOREIGN PATENT DOCUMENTS

WO 9213631 8/1992
WO 2010077352 7/2010
(Continued)

OTHER PUBLICATIONS

ISRWO International Search Report and Written Opinion for PCT/US2021/024550 dated Jun. 25, 2021.
(Continued)

*Primary Examiner* — Renee Robinson
(74) *Attorney, Agent, or Firm* — C. Tumey Law Group PLLC

(57) ABSTRACT

Provided herein are molecular sieve membranes for separating hydrocarbons of a lube feed stock into a permeate and a retentate based on molecular shape. The molecular sieve membranes comprise one or more layers of size-selective catalyst and a porous support comprising a plurality of diffusing gaps. Each layer of size-selective catalyst has a plurality of perpendicular membrane channels and a plural-
(Continued)

ity of opening pores. The porous support is in fluidic communication with the plurality of opening pores to provide a fluidic pathway between the perpendicular membrane channels and the diffusing gaps. Also provided are processes for separating n-paraffins from other hydrocarbons in a lube feed stock using the present molecular sieve membranes.

19 Claims, 6 Drawing Sheets

(51) Int. Cl.
*B01D 69/04* (2006.01)
*B01D 69/10* (2006.01)
*B01D 71/02* (2006.01)
*C10G 31/09* (2006.01)
*C10M 101/02* (2006.01)
*C10M 169/04* (2006.01)
*C10M 177/00* (2006.01)
*C10G 67/02* (2006.01)
*C10N 30/10* (2006.01)

(52) U.S. Cl.
CPC ......... *B01D 71/0281* (2022.08); *C10G 31/09* (2013.01); *C10M 101/025* (2013.01); *C10M 169/04* (2013.01); *C10M 177/00* (2013.01); *B01D 2315/10* (2013.01); *B01D 2325/021* (2013.01); *B01D 2325/02831* (2022.08); *B01D 2325/20* (2013.01); *C10G 67/02* (2013.01); *C10M 2290/02* (2013.01); *C10N 2030/10* (2013.01)

(56) References Cited

FOREIGN PATENT DOCUMENTS

| WO | 2016107912 | 7/2016 |
| WO | 2020005744 | 1/2020 |
| WO | 2020005745 | 1/2020 |

OTHER PUBLICATIONS

Kim, H.-J., Jang, K.-S., Galebach, P., Gilbert, C., Tompsett, G., Conner, W. C., . . . Nair, S. (2013). Seeded growth, silylation, and organic/water separation properties of MCM-48 membranes. Journal of Membrane Science, 427, 293-302.

Varoon, K., Zhang, X., Elyassi, B., Brewer, D. D., Gettel, M., Kumar, S., . . . Tsapatsis, M. (2011). Dispersible Exfoliated Zeolite Nanosheets and Their Application as a Selective Membrane. Science, 334(6052), 72-75.

* cited by examiner

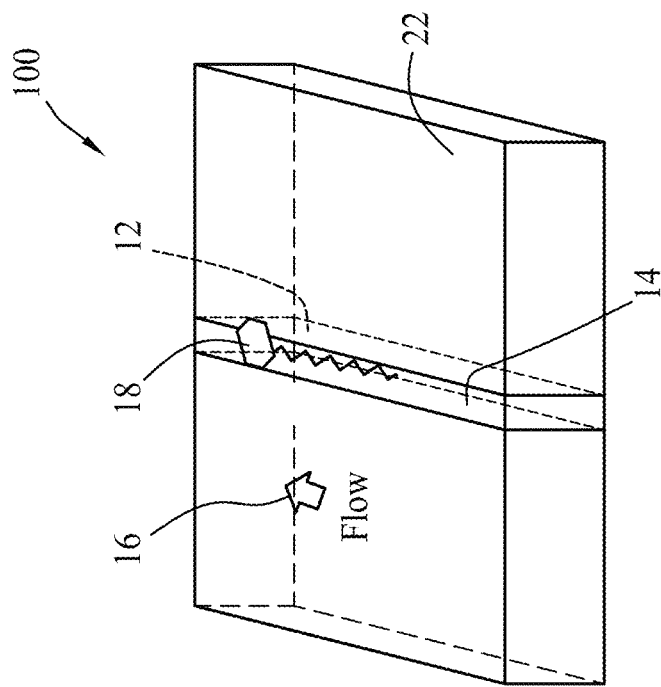
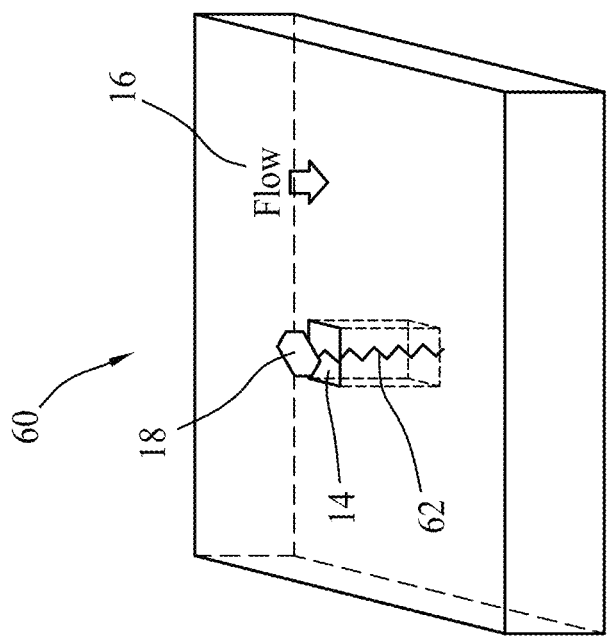
FIG. 1B
FIG. 1A

WAX AND LUBE BASE STOCK PRODUCTS USING SHAPE SELECTIVE MEMBRANE SEPARATION

FIELD OF THE INVENTION

The present invention relates to membranes useful in separating hydrocarbons of a lube feed stock to provide wax product and lube base stock products.

BACKGROUND OF THE INVENTION

Unless the base stock is further accompanied by severe hydrotreating, solvent refined or extracted base stocks fall into the American Petroleum Institute ("API") Group I type base stock. Historically, plants which produce Group I base stock have been a primary source of wax, largely n- and iso-paraffins having high melting points. However, with the conversion to hydroprocessing of Groups II and III base stocks and other high quality, premium base stocks, the long-term outlook for Group I lube plants is compromised. As such, wax has become and will continue to be in short supply to make premium lube base stocks.

To increase the amount of available wax, membrane-based separations can offer lower energy consumption and fabrication costs as well as a steady-state operation. Inorganic membranes, such as zeolite membranes, have high permeability and selectivity, as well as thermal and chemical resistance. However, these applications are limited by the complexity of fabricating a continuous inorganic membrane structure on a scalable, low-cost platform.

Alternatively, polymeric membranes, a predominant class of membranes in commercial applications are often used. Separation of wax products with a polymeric membrane, however, has intrinsic limitations because of a trade-off between permeability and selectivity of the membrane, stability issues and fouling under harsh conditions.

A need exists for membrane-based separation that can selectively separate wax from other hydrocarbons without the drawbacks of both short and long deactivation and fouling.

SUMMARY OF THE INVENTION

Provided herein are molecular sieve membranes for separating hydrocarbons of a lube feed stock into a permeate and a retentate based on molecular shape. The molecular sieve membranes comprise one or more layers of size-selective catalyst and a porous support comprising a plurality of diffusing gaps. Each layer of size-selective catalyst has a plurality of perpendicular membrane channels and a plurality of opening pores. The plurality of perpendicular membrane channels are in fluidic communication with the plurality of opening pores. The porous support is in fluidic communication with the plurality of opening pores to provide a fluidic pathway between the perpendicular membrane channels and the diffusing gaps.

The molecular sieve membrane is configured for cross-flow of the lube feed stock over the molecular sieve membrane causing a continuous flow of the permeate into the perpendicular membrane channels through the plurality of opening pores into and out of the diffusing gaps of the porous support.

In an aspect, the size-selective catalyst comprises zeolite or mordenite. In an aspect, the porous support comprises graphite, clays and/or two-dimensional ionic conductors. In an aspect, the porous support is a single layer. In an aspect, the porous support is a coating. In an aspect, the size-selective catalyst comprises a crystal structure of ZSM48 and/or mordenite. In an aspect, each of the perpendicular membrane channels is between about 4 Angstroms to about 10 Angstroms. In an aspect, each of the perpendicular membrane channels is between about 4 Angstroms to about 8 Angstroms. In an aspect, each of the perpendicular membrane channels is between about 4 Angstroms to about 6 Angstroms. In an aspect, the molecular sieve membrane is not acidic as determined by titration, ammonia adsorption, pyridine adsorption, or a combination thereof, as described in B C Gates, J R Katzer, and G C A Schuit, *Chemistry of Catalytic Processes*, Ch. 1, McGraw Hill (1979). In an aspect, the membrane is tubular. In an aspect, the molecular sieve membrane is configured to separate wax from lube oil. In an aspect, the membrane channels are two dimensional in shape.

Also provided herein are processes for separating n-paraffins from other hydrocarbons comprising the steps of (a) providing a lube feed stock comprising a plurality of n-paraffins and a plurality of ring molecules; (b) contacting the lube feed stock with the molecular sieve membrane of claim 1; and (c) separating the permeate to produce a wax product without solvent, wherein the permeate comprises the plurality of n-paraffins suitable as a wax and the retentate comprises the plurality of ring molecules. In an aspect, the lube feed stock is a waxy intermediate. In an aspect, the hydrocarbons comprise a plurality of paraffins and a plurality of ring molecules and the plurality of paraffins are separated from the plurality of ring molecules.

Further provided herein are processes for separating paraffins in a hydrotreated hydrocarbon stream comprising the steps of: (a) providing a hydrotreated hydrocarbon stream comprising paraffins, aromatics and/or other multi-ring hydrocarbon compounds; (b) contacting the hydrotreated hydrocarbon stream with the present molecular sieve membrane; and (c) separating the paraffins to provide a wax product feed stream for catalytic dewaxing, and a stream of fuel or lube by-products. A solvent is not required in the separation process.

the wax product stream comprises paraffins, 1-ring naphthenes, and ringed aromatics and the lube product stream comprises multi-ring naphthenes.

In an aspect, the lube feed stock comprises Group II+ base stock. In an aspect, the permeate or retentate comprises a Group III+ base stock. In an aspect, the process is carried out in blocked mode operation. In an aspect, the process is carried out at an operating temperature of about 100° C. to minimize isomerization activity. In an aspect, the process is carried out at an operating temperature of about 200° C. to minimize isomerization activity. In an aspect, the process is carried out at an operating temperature of about 300° C. to minimize isomerization activity. In an aspect, the process further comprises the step of pretreating the molecular sieve membrane to minimize acidity of the molecular sieve membrane. In an aspect, the permeate has a volume between about 65 vol % and about 75 vol % of a clean Group I, Group II, or Group III lube base stock and the retentate has a volume between about 25 vol % and about 35 vol % of the clean Group I, Group II, or Group III lube base stock. In an aspect, the permeate comprises paraffins in a volumetric amount of about 45 vol % of the clean Group I, Group II, or Group III lube base stock and comprises 1-ring naphthene in a volumetric amount of about 25 vol % of the clean Group I, Group II, or Group III lube base stock and the retentate comprises multi-ring naphthene and mono-aromatics in a volumetric amount of about 30 vol % of the clean Group I, Group II, or Group III lube base stock. In an aspect, the permeate has good oxidative stability when blended with anti-oxidants and other additives, as determined by Sequence III-G automotive engine oil testing and the Turbine Oil Oxidation Stability Test.

BRIEF DESCRIPTION OF THE DRAWINGS

FIG. 1A shows a molecular sieve membrane having a one-dimensional pore.

FIG. 1B shows a molecular sieve membrane having a slotted pore channel.

DETAILED DESCRIPTION OF THE INVENTION

Figure 2:
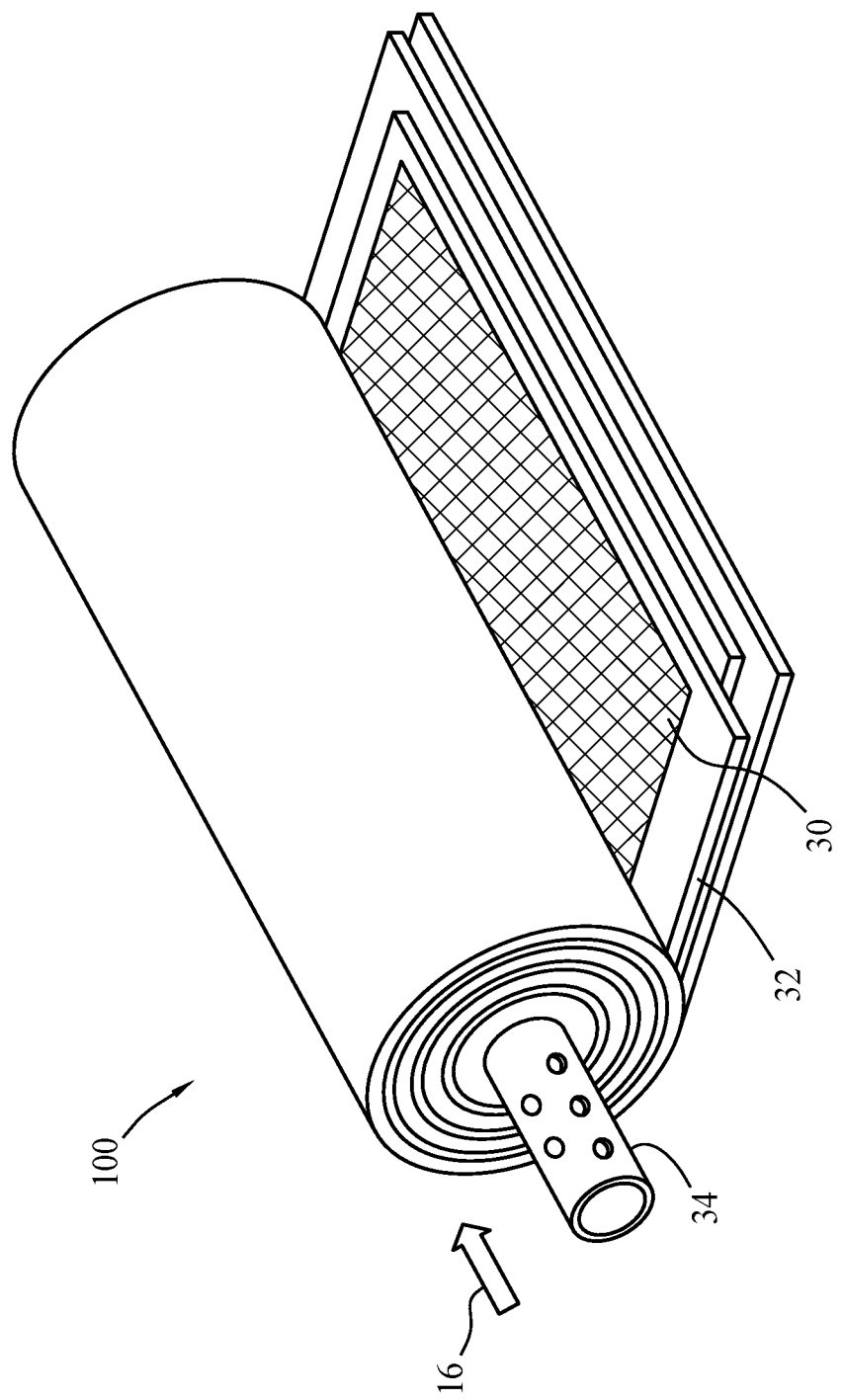
FIG. 2 depicts multiple membranes sealed together to provide a molecular sieve membrane that has been spirally wound.

Before the present compounds, components, compositions, and/or methods are disclosed and described, it is to be understood that unless otherwise indicated this disclosure is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular aspects only and is not intended to be limiting.

All numerical values within the detailed description and the claims herein are modified by "about" or "approximately" the indicated value, taking into account experimental error and variations.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

For the purposes of this disclosure, the following definitions will apply:

For purposes of this invention and the claims hereto, the numbering scheme for the Periodic Table Groups is according to the IUPAC Periodic Table of Elements as of Jan. 1, 2020.

The term "and/or" as used in a phrase such as "A and/or B" herein is intended to include "A and B", "A or B", "A", and "B".

As used herein, the term "alpha-olefin" refers to an olefin having a terminal carbon-to-carbon double bond (($R_1R_2$)—$C=CH_2$) in the structure thereof.

As used herein, the term "aromatic" refers to unsaturated hydrocarbons comprising an aromatic ring in structures thereof, the aromatic ring having a delocalized conjugated pi system and having from 4 to 20 carbon atoms. The aromatic ring can comprise one or more heteroatoms. Examples of heteroatoms include, but are not limited to, nitrogen, oxygen, and/or sulfur. Aromatics with one or more heteroatom in the aromatic ring therein include, but are not limited to furan, benzofuran, thiophene, benzothiophene, oxazole, thiazole and the like, and combinations thereof. The aromatic ring can be monocyclic, bicyclic, tricyclic, and/or polycyclic (in some embodiments, at least monocyclic rings, only monocyclic and bicyclic rings, or only monocyclic rings) and can be fused rings. Exemplary aromatics include, but are not limited to benzenes, toluenes, xylenes, mesitylenes, ethylbenzenes, cumenes, naphthalenes, methylnaphthalenes, dimethylnaphthalenes, ethylnaphthalenes, acenaphthalenes, anthracenes, phenanthrenes, tetraphenes, naphthacenes, benzanthracenes, fluoranthenes, pyrenes, chrysenes, triphenylenes, and the like, and combinations thereof. The aromatic can optionally be substituted, e.g., with one or more alkyl group, alkoxy group, halogen, etc. Aromatics can be measured by one or more of several methods, including supercritical fluid chromatography (ASTM D5186), high-pressure liquid chromatography (HPLC) (ASTM D6379), chromatography over alumina/silica gel (ASTM D2549), preparative chromatography (ASTM D2007), and ultraviolet (UV) spectroscopy.

The term "base stock" is a lubricant component that is produced by a single manufacturer to the same specifications (independent of feed source or manufacturer's location), meets the same manufacturer's specification, and is identified by a unique formula, product identification number or both. American Petroleum Institute (API) 1509, Engine Oil Licensing and Certification System, 15$^{th}$ ed., April 2002, Appendix E. API Base Oil Interchangeability Guidelines for Passenger Cr Motor Oils and Diesel Engine Oils, 2004, Section E.1.2, Definitions (Washington, D.C.: American Petroleum Institute).

Unless otherwise specified, the term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different hydrocarbon chain lengths.

As used herein, a "lubricant" refers to a substance that can be introduced between two or more moving surfaces and lowers the level of friction between two adjacent surfaces moving relative to each other.

As used herein, an "olefin" refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin can be straight-chain, branched-chain or cyclic. "Olefin" is intended to embrace all structural isomeric forms of olefins, unless it is specified to mean a single isomer or the context clearly indicates otherwise.

As used herein, a "polyalpha-olefin(s)" ("PAO(s)") includes any oligomer(s) and polymer(s) of one or more alpha-olefin monomer(s). Thus, the PAO can be a dimer, a trimer, a tetramer, or any other oligomer or polymer comprising two or more structure units derived from one or more alpha-olefin monomer(s). The PAO molecule can be highly regio-regular, such that the bulk material exhibits an isotacticity, or a syndiotacticity when measured by 13C NMR. The PAO molecule can be highly regio-irregular, such that the bulk material is substantially atactic when measured by 13C NMR. A PAO material made by using a metallocene-based catalyst system is typically called a metallocene-PAO ("mPAO"), and a PAO material made by using traditional non-metallocene-based catalysts (e.g., Lewis acids, supported chromium oxide, and the like) is typically called a conventional PAO ("cPAO").

As used herein, the term "viscosity index" or "VI" is a measure of the extent of viscosity change with temperature; the higher the VI, the less change, and generally speaking, higher VIs are preferred. VI is usually calculated from measurements at 40° C. and 100° C. The minimum VI for a paraffinic base stock is typically between about 80 and about 95, as established by automotive market needs. Naphthenic base stocks may have VIs around zero. The conventional solvent extraction/solvent dewaxing route produces base stocks with VIs of about 95. Lower raffinate yields (higher extract yields) in solvent refining mean higher VIs, but it is difficult economically to go much above 105. Viscosity index is an empirical, unitless number which indicates the rate of change in the viscosity of an oil within a given temperature range. Fluids exhibiting a relatively large change in viscosity with temperature are said to have a low viscosity index. A low VI oil, for example, will thin out at elevated temperatures faster than a high VI oil. Usually, the high VI oil is more desirable because it has higher viscosity at higher temperature, which translates into better or thicker lubrication film and better protection of the contacting machine elements.

As used herein, the term "pour point" is the temperature at which a base stock no longer flows. For paraffinic base stocks, pour points can be between about −18° C. and about −6° C., as determined by operation of the dewaxing unit. For specialty purposes, pour points can be much lower. The pour points of naphthenic base stocks, which can have very low wax content, may be much lower (−30° C. to −50° C.). For very viscous base stocks such as Bright stocks, pour points can reflect a viscosity limit. Pour points are measured by ASTM D97.

Shape selective membranes have been prepared, but are not known to be demonstrated for shape selection of wax or lube molecules. Similarly shape selective catalyst are used for manufacturing base stocks. However, shape selective catalyst are not known for separating n-paraffins from other hydrocarbons. Wax supply from petroleum sources, the primary source of wax products, is being reduced by the replacement of Group I (GI) solvent processing with hydroprocessing technology (Group II/III catalytic processes). Waxes are in short supply both for making wax products and as feed for making premium lube base stocks by hydroisomerization. As part of the petroleum wax market outlook, GI lube plants are currently the main source of wax products. Group II and Group III (GII and GIII) lube production is compromising the long-term outlook for GI lube plants. Supply decline is currently constraining the future wax demand growth and it is impacting wax prices. Both short term and long term wax price forecast is driven by supply shortage due to decreasing supply of petroleum waxes. Wax consumption, however, is expected to grow at an average annual growth rate of more than 2% between the years 2010 to 2020. New lube plant producing GII and GIII lubes produce high quality lubes but they are not designed to produce wax products.

Therefore, provided herein are molecular sieve membranes useful to separate a lube feed stock on molecular shape. The lube feed stock can be separated into a permeate of paraffins useful as a wax product stream, and a retentate of other hydrocarbons that can include multi-ring naphthene and mono-aromatics.

Lube Feed Stock

As used herein, a lube feed stock contacts or flows over the molecular sieve membrane to provide a permeate and a retentate. Generally, the lube feed stock is a liquid mixture of hydrocarbons. The lube feed stock can contain mixtures of high-boiling hydrocarbons, such as heavy oil fractions, vacuum distillate fractions derived from an atmospheric residue (distillate fractions obtained by vacuum distillation of a residual fraction which in return is obtained by atmospheric distillation of a crude oil), deasphalted residual oil fractions, including both deasphalted atmospheric residues and deasphalted vacuum residues, hydrocrackate, waxy crudes, gas oils, and/or lube base stocks. The lube feed stock is selected based on process applications and requirements upstream and/or downstream of the molecular sieve membrane.

The lube feed stock stream can be any feed stock stream containing aromatics and/or multi-ring molecules to be removed including a base stock as described herein, a hydrotreated hydrocarbon stream (catalytically processed crude), and/or crude. For example, the lube feed stock can be a waxy intermediate that has been hydrotreated and/or hydrorefined, a dewaxed hydrocarbon stream, and/or other hydrocarbon stream subject to a conversion process or hydroprocessing. If the lube feed stock has been subject to a solvent dewaxing process, all measurable amount of solvent has been removed.

The lube feed stock can contain waxes that boil in the lubricating oil range typically having a 10% distillation point at 200° C. or higher, ranging to 600° C., as measured by ASTM D2887 or D7169. Examples of waxes having relatively high amounts of waxy compounds are synthetic waxy raffinates (Fischer-Tropsch waxy raffinates), hydrocracker bottom fractions (hydrowax), i.e. those fractions having a final boiling point of at least 320° C., preferably at least 360° C. and slack waxes obtained from the dewaxing of hydroprocessed or solvent refined waxy distillates. These waxes have a wax content of at least 50 wt. %, or at least 80 wt. %, or at least 90 wt. %. The amount of wax can be determined by ASTM D3235. Waxy molecules include linear paraffins.

The lube feed stock can be a refined lubricant stock used by itself, or it can be blended with another refined lubricant stock having different properties. Prior to use the lube feed stock can be compounded with one or more additives which function, for example, as antioxidants, extreme pressure additives and/or VI improvers. The lube feed stock additionally contains waxy components which are n- or iso-paraffins, and the majority of the lube base stock can be expected to have a boiling point above 250° C.

If the lube feed stock contains sulfur and/or nitrogen contaminants, for example, with the amount of sulfur up to 3 wt. % and the amount of nitrogen up to 1 wt. %, it can be advantageous to subject the lube feed stock to catalytic hydrodesulfurization or catalytic de-nitrogenation prior to the separation process of the present invention. Furthermore, the lube feed stock can have been hydrotreated and/or hydrocracked before being subjected to separation.

Base stocks are distinguished by viscosity and are produced to certain viscosity specifications. Since viscosity is approximately related to molecular weight, the first step in manufacturing a base stock is to separate out lube precursor molecules of feedstock having the correct molecular weight range by distillation in a crude fractionation system. Lower-boiling fuel products of low viscosities and volatilities that have no application in lubricants are distilled off. Therefore, higher molecular weight feedstocks (which do not vaporize at atmospheric pressure) can be fractionated by distillation at reduced pressure between about 10 mmHg to about 50 mmHg. The higher molecular weight feedstock is then fed to a vacuum tower where intermediate product streams such as light vacuum gas oil ("LVGO") and heavy vacuum gas oil ("HVGO") are produced. These intermediate product streams can be narrow cuts of specific viscosities destined for a solvent refining step, or they can be broader cuts destined for hydrocracking to lubes and fuels.

As used herein, the lube feed stock can have a kinematic viscosity at 100° C. of about 1.5 cSt to about 35 cSt, or 1.5 cSt to 30 cSt, or 1.5 cSt to 25 cSt, or 1.5 cSt to 20 cSt, or 1.5 cSt to 16 cSt, or 1.5 cSt to 12 cSt, or 1.5 cSt to 10 cSt, or 1.5 cSt to 8 cSt, or 1.5 cSt to 6 cSt, or 1.5 cSt to 5 cSt, or 1.5 cSt to 4 cSt, or 2.0 cSt to 35 cSt, or 2.0 cSt to 30 cSt, or 2.0 cSt to 25 cSt, or 2.0 cSt to 20 cSt, or 2.0 cSt to 16 cSt, or 2.0 cSt to 12 cSt, or 2.0 cSt to 10 cSt, or 2.0 cSt to 8 cSt, or 2.0 cSt to 6 cSt, or 2.0 cSt to 5 cSt, or 2.0 cSt to 4 cSt, or 2.5 cSt to 35 cSt, or 2.5 cSt to 30 cSt, or 2.5 cSt to 25 cSt, or 2.5 cSt to 20 cSt, or 2.5 cSt to 16 cSt, or 2.5 cSt to 12 cSt, or 2.5 cSt to 10 cSt, or 2.5 cSt to 8 cSt, or 2.5 cSt to 6 cSt, or 2.5 cSt to 5 cSt, or 2.5 cSt to 4 cSt, or 3.0 cSt to 35 cSt, or 3.0 cSt to 30 cSt, or 3.0 cSt to 25 cSt, or 3.0 cSt to 20 cSt, or 3.0 cSt to 16 cSt, or 3.0 cSt to 12 cSt, or 3.0 cSt to 10 cSt, or 3.0 cSt to 8 cSt, or 3.0 cSt to 6 cSt, or 3.5 cSt to 35 cSt, or 3.5 cSt to 30 cSt, or 3.5 cSt to 25 cSt, or 3.5 cSt to 20 cSt, or 3.5 cSt to 16 cSt, or 3.5 cSt to 12 cSt, or 3.5 cSt to 10 cSt, or 3.5 cSt to 8 cSt, or 3.5 cSt to 6 cSt.

Additionally or alternatively, the lube feed stock can have a viscosity index of about 50 to about 120, or 60 to 120, or 70 to 120, or 80 to 120, or 90 to 120, or 100 to 120, or 50 to 110, or 60 to 110, or 70 to 110, or 80 to 110, or 90 to 110, or 50 to 100, or 60 to 100, or 70 to 100, or 80 to 100, or 50 to 90, or 60 to 90, or 70 to 90, or 50 to 80, or 60 to 80.

As an alternative to characterizing the lube feed stock based on viscosity index, a lube feed stock can be characterized based on the paraffin content of the feed. In such aspects, a lube feed stock for forming a high viscosity base stock can have a paraffin content of at least about 30 wt. %, or at least about 35 wt. %.

Additionally or alternatively, the lube feed stock can have a density at 15.6° C. of about 0.91 g/cm$^3$ or less, or about 0.90 g/cm$^3$ or less, or about 0.89 g/cm$^3$ or less, or about 0.88 g/cm$^3$, or about 0.87 g/cm$^3$, such as down to about 0.84 g/cm$^3$ or lower.

Furthermore or alternatively, the molecular weight of the lube feed stock can be characterized based on number average molecular weight (corresponding to the typical average weight calculation), and/or based on mass or weight average molecular weight, where the sum of the squares of the molecular weights is divided by the sum of the molecular weights, and/or based on polydispersity, which is the weight average molecular weight divided by the number average molecular weight.

The number average molecular weight Mn of a feed can be mathematically expressed as $$M_n = \frac{\sum_i N_i M_i}{\sum_i N_i} \quad (1)$$

In Equation (1), Ni is the number of molecules having a molecular weight Mi. The weight average molecular weight, Mw, gives a larger weighting to heavier molecules. The weight average molecular weight can be mathematically expressed as $$M_w = \frac{\sum_i N_i M_i^2}{\sum_i N_i M_i} \quad (2)$$

The polydispersity can then be expressed as Mw/Mn. In various aspects, the lube feed stock can have a polydispersity of 1.30 or less, or 1.25 or less, or 1.20 or less, and/or at least about 1.0. Additionally, or alternatively, the lube feed stock can have a number average molecular weight (Mn) of 300 to 1000 g/mol. Additionally, or alternatively, the lube feed stock can have a weight average molecular weight (Mw) of 500 to 1200 g/mol.

As described herein, the lube feed stock comprises a hydrocarbon feedstock that is any one or more of a wide variety of petroleum and chemical feedstocks. In accordance with various embodiments of the invention, and by way of example, hydrocarbon feedstocks can be whole and reduced petroleum crudes, atmospheric, cycle oils, gas oils, including vacuum gas oils and coker gas oils, light to heavy distillates including raw virgin distillates, hydrocrackates, hydrotreated oils, petroleum-derived waxes (including slack waxes), Fischer-Tropsch waxes, raffinates, deasphalted oils and mixtures of these materials. Hydrocarbon feedstocks also include deasphalted oil (DAO), vacuum gas oil (VGO), vacuum distillates, intermediate streams, or combinations thereof.

In an aspect, a hydrocarbon feedstock stream of the lube feed stock flows over one or more of the molecular sieve membranes in a cross-flow manner. In accordance with various embodiments of the invention, the lube feed stock (hydrocarbon feedstock stream) can be VGO/distillate straight from a 'fuels' based atmospheric/vacuum distillation tower. VGO/distillate from a 'lubes' based vacuum distillation tower, hydroprocessed VGO/distillate/DAO. In some embodiments, the hydrocarbon feedstream is a stream of Group I or II base stock.

To set boiling point ranges for a hydrocarbon feedstock, an initial boiling point for a hydrocarbon feedstream and/or a final boiling point for a hydrocarbon feedstream can be used. Another option is to characterize a hydrocarbon feedstream based on the amount of the hydrocarbon feedstream that boils at one or more temperatures. For example, a "T5" boiling point/distillation point for a hydrocarbon feedstream is defined as the temperature at which 5 wt. % of the hydrocarbon feedstream will boil off. Similarly, a "T95" boiling point/distillation point is a temperature at which 95 wt. % of the hydrocarbon feedstream will boil. Boiling points, including fractional weight boiling points, can be determined using an appropriate ASTM test method, such as the procedures described in ASTM D2887, D2892, D6352, D7169 and/or D86.

Hydrocarbon feedstreams contemplated by the present invention in various embodiments include, for example, hydrocarbon feedstreams with an initial boiling point or a T5 boiling point or T10 boiling point of at least 600° F. (~316° C.), or at least 650° F. (~343° C.), or at least 700° F. (~371° C.), or at least 750° F. (~399° C.). Additionally or alternatively, the final boiling point or T95 boiling point or T90 boiling point of the hydrocarbon feedstreams can be 1100°

F. (~593° C.) or less, or 1050° F. (~566° C.) or less, or 1000° F. (~538° C.) or less, or 950° F. (~510° C.) or less. In particular, a hydrocarbon feedstream can have a T5 boiling point of at least 600° F. (~316° C.) and a T95 boiling point of 1100° F. (~593° C.) or less, or a T5 boiling point of at least 650° F. (~343° C.) and a T95 boiling point of 1050° F. (~566° C.) or less, or a T10 boiling point of at least 650° F. (~343° C.) and a T90 boiling point of 1050° F. (~566° C.) or less. Optionally, if hydroprocessing treatments are used to form fuel, it is possible to use a hydrocarbon feedstream that includes a lower boiling range portion. Such a hydrocarbon feedstream can have an initial boiling point or a T5 boiling point or T10 boiling point of at least 350° F. (~177° C.), or at least 400° F. (~204° C.), or at least 450° F. (~232° C.). In particular, such a hydrocarbon feedstream can have a T5 boiling point of at least 350° F. (~177° C.) and a T95 boiling point of 1100° F. (~593° C.) or less, or a T5 boiling point of at least 450° F. (~232° C.) and a T95 boiling point of 1050° F. (~566° C.) or less, or a T10 boiling point of at least 350° F. (~177° C.) and T90 boiling point of 1050° F. (~566° C.) or less.

In accordance to various embodiments of the present invention, an aromatics content of the hydrocarbon feedstream can be at least 20 wt. %, or at least 25 wt. %, or at least 30 wt. %, or at least 40 wt. %, or at least 50 wt. %, or at least 60 wt. %, such as up to 75 wt. % or up to 90 wt. %. In particular, the aromatics content can be 25 wt. % to 75 wt. %, or 25 wt. % to 90 wt. %, or 35 wt. % to 75 wt. %, or 35 wt. % to 90 wt. %. In other aspects, the feed can have a lower aromatics content, such as an aromatics content of 35 wt. % or less, or 25 wt. % or less, such as down to 0 wt. %. In particular, the aromatics content can be 0 wt. % to 35 wt. %, or 0 wt. % to 25 wt. %, or 5.0 wt. % to 35 wt. %, or 5.0 wt. % to 25 wt. %. In a preferred embodiment, the hydrocarbon feedstream has an aromatics content of about 25 wt. % to about 75 wt. %.

In aspects where the hydroprocessing includes a hydrotreatment process and/or a sour hydrocracking process, the hydrocarbon feedstreams can have a sulfur content of 500 wppm to 20000 wppm or more, or 500 wppm to 10000 wppm, or 500 wppm to 5000 wppm. Additionally or alternatively, the nitrogen content of such a hydrocarbon feedstream can be 20 wppm to 4000 wppm, or 50 wppm to 2000 wppm. In some aspects, the hydrocarbon feedstream can correspond to a "sweet" hydrocarbon feedstream, so that the sulfur content of the hydrocarbon feedstream is 10 wppm to 500 wppm and/or the nitrogen content is 1 wppm to 100 wppm.

At least a portion of the hydrocarbon feedstream can correspond to a hydrocarbon feedstream derived from a biocomponent source. In this discussion, a bicomponent feedstock refers to a hydrocarbon feedstock derived from a biological raw material component, from bicomponent sources such as vegetable, animal, fish, and/or algae. Note that, for the purposes of this document, vegetable fats/oils refer generally to any plant-based material, and can include fat/oils derived from a source such as plants of the genus Jatropha. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Catalytic Base Stock Production

In the various embodiments of the invention, base stocks can be catalytically hydroprocessed to improve properties of the base stock. Optional catalytic processing can include one or more of hydrotreatment, catalytic dewaxing, and/or hydrofinishing. In aspects where more than one type of catalytic processing is performed, the effluent from a first type of catalytic processing can optionally be separated prior to the second type of catalytic processing. For example, after a hydrotreatment or hydrofinishing process, a gas-liquid separation can be performed to remove light ends, $H_2S$, and/or $NH_3$ that can have formed.

Hydrotreatment typically reduces sulfur, nitrogen, and aromatic content of the feedstock. Catalysts used in hydrotreatment of the heavy portion of a crude oil can include conventional hydroprocessing catalysts, such as those that comprise at least one Group VIII non-noble metal (Columns 8-10 of IUPAC periodic table), such as Fe, Co, and/or Ni, such as Co and/or Ni; and at least one Group VI metal (Column 6 of IUPAC periodic table), such as Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from about 50 to about 200 Å, or about 75 to about 150 Å, a surface area from about 100 to about 300 $m^2/g$, or about 150 to about 250 $m^2/g$, and a pore volume of from about 0.25 to about 1.0 $cm^3/g$, or about 0.35 to about 0.8 $cm^3/g$. More generally, any convenient size, shape, and/or pore size distribution for a catalyst suitable for hydrotreatment of a distillate (including lubricant hydrocarbon composition) boiling range feed in a conventional manner can be used. It is within the scope of the present disclosure that more than one type of hydroprocessing catalyst can be used in one or multiple reaction vessels.

The at least one Group VIII non-noble metal, in oxide form, can typically be present in an amount ranging from about 2 wt. % to about 40 wt. %, and from about 4 wt. % to about 15 wt. %. The at least one Group VI metal, in oxide form, can typically be present in an amount ranging from about 2 wt. % to about 70 wt. %, for supported catalysts from about 6 wt. % to about 40 wt. % or from about 10 wt. % to about 30 wt. %. The weight percent is based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% tungsten as oxide) on alumina, silica, silica-alumina, or titania.

The hydrotreatment can be carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this disclosure, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage can contain at least about 50 vol. % and at least about 75 vol. % hydrogen.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of $0.1\ hr^{-1}$ to $10\ hr^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

Additionally, or alternately, the base stock can be exposed to catalytic dewaxing conditions. Catalytic dewaxing can be used to improve the cold flow properties of the base stock and/or the hydrocarbon composition, and potentially perform some heteroatom removal and aromatic saturation. Suitable dewaxing catalysts can include molecular sieves such as crystalline aluminosilicates (zeolites). In an aspect, the molecular sieve can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally, molecular sieves that are selective for dewaxing by isomerization as opposed to cracking can be used, such as ZSM-48, zeolite Beta, ZSM-23, or a combination thereof. Additionally, or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Preferred materials are EU-2, EU-11, ZBM-30, ZSM-48, or ZSM-23. Note that the zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23. Optionally, the dewaxing catalyst includes a binder for the molecular sieve, such as alumina, titania, silica, silica-alumina, zirconia, or a combination thereof, for example alumina and/or titania or silica and/or zirconia and/or titania.

The dewaxing catalysts used in processes include catalysts with a low ratio of silica to alumina. For example, for ZSM-48, the ratio of silica to alumina in the zeolite can be less than about 200:1, such as less than about 110:1, or less than about 100:1, or less than about 90:1, or less than about 75:1. In various aspects, the ratio of silica to alumina can be from 50:1 to 200:1, such as 60:1 to 160:1, or 70:1 to 100:1.

In any aspect, the catalysts according to the disclosure further include a metal hydrogenation component. The metal hydrogenation component is typically a Group VI and/or a Group VIII metal. In an aspect, the metal hydrogenation component can be Pt, Pd, or a mixture thereof. In an alternative, the metal hydrogenation component can be a combination of a non-noble Group VIII metal with a Group VI metal. Suitable combinations can include Ni, Co, or Fe with Mo or W.

The metal hydrogenation component can be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt. % based on catalyst, or at least about 0.15 wt. %, or at least about 0.2 wt. %, or at least about 0.25 wt. %, or at least about 0.3 wt. %, or at least about 0.5 wt. % based on catalyst. The amount of metal in the catalyst can be about 20 wt. % or less based on catalyst, or about 10 wt. % or less, or about 5 wt. % or less, or about 2.5 wt. % or less, or about 1 wt. % or less. Where the metal is Pt, Pd, another Group VIII noble metal, or a combination thereof, the amount of metal can be from about 0.1 to about 5 wt. %, from about 0.1 to about 2 wt. %, or about 0.25 to about 1.8 wt. %, or about 0.4 to about 1.5 wt. %. For aspects where the metal is a combination of a non-noble Group VIII metal with a Group VI metal, the combined amount of metal can be from 0.5 wt. % to 20 wt. %, or 1 wt. % to 15 wt. %, or 2.5 wt. % to 10 wt. %.

The dewaxing catalysts can also include a binder. In some embodiments, the dewaxing catalysts can be formulated using a low surface area binder, where a low surface area binder represents a binder with a surface area of 100 $m^2/g$ or less, or 80 $m^2/g$ or less, or 70 $m^2/g$ or less. The amount of zeolite in a catalyst formulated using a binder can be from about 30 wt. % zeolite to 90 wt. % zeolite relative to the combined weight of binder and zeolite. The amount of zeolite is at least about 50 wt. % of the combined weight of zeolite and binder, such as at least about 60 wt. % or from about 65 wt. % to about 80 wt. %.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst can range from 0.1 to 3.33 wt. %, or 0.1 to 2.7 wt. %, or 0.2 to 2 wt. %, or 0.3 to 1 wt. %.

Process conditions in a catalytic dewaxing zone in a sour environment can include a temperature of from about 200° C. to about 450° C., and about 270° C. to about 400° C., a hydrogen partial pressure of from 1.8 MPag to 34.6 MPag (250 psig to 5000 psig), and 4.8 MPag to 20.8 MPag, and a hydrogen circulation rate of from 35.6 $m^3/m^3$ (200 scf/B) to 1781 $m^3/m^3$ (10,000 scf/B), and 178 $m^3/m^3$ (1000 scf/B) to 890.6 $m^3/m^3$ (5000 scf/B). Other conditions can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 $m^3/m^3$ to about 1068 $m^3/m^3$ (1200 scf/B to 6000 scf/B). These latter conditions can be suitable, for example, if the dewaxing stage is operating under sour conditions. The LHSV can be from about 0.2 $h^{-1}$ to about 10 $h^{-1}$, such as from about 0.5 $h^{-1}$ to about 5 $h^{-1}$ and/or from about 1 $h^{-1}$ to about 4 $h^{-1}$.

Additionally, or alternately, the base stock can be exposed to hydrofinishing or aromatic saturation conditions to provide a high viscosity base stock. Hydrofinishing and/or aromatic saturation catalysts can include catalysts containing Group VI metals, Group VIII metals, and mixtures thereof. In an aspect, the metals include at least one metal sulfide having a strong hydrogenation function. In an aspect, the hydrofinishing catalyst can include a Group VIII noble metal, such as Pt, Pd, or a combination thereof. The mixture of metals can also be present as bulk metal catalysts wherein the amount of metal is about 30 wt. % or greater based on catalyst. Suitable metal oxide supports include low acidic oxides such as silica, alumina, silica-aluminas or titania. The hydrofinishing catalysts for aromatic saturation will comprise at least one metal having relatively strong hydrogenation function on a porous support. Typical support materials include amorphous or crystalline oxide materials such as alumina, silica, and silica-alumina. The support materials can also be modified, such as by halogenation, or in particular, fluorination. The metal content of the catalyst is often as high as about 20 wt. % for non-noble metals. In an aspect, the hydrofinishing catalyst can include a crystalline material belonging to the M41S class or family of catalysts. The M41S family of catalysts are mesoporous materials having high silica content. Examples include MCM-41, MCM-48 and MCM-50. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from about 125° C. to about 425° C., and about 180° C. to about 280° C., a hydrogen partial pressure from about 500 psig (3.4 MPa) to about 3000 psig (20.7 MPa), and about 1500 psig (10.3 MPa) to about 2500 psig (17.2 MPa), and liquid hourly space velocity from about 0.1 hr$^{-1}$ to about 5 hr$^{-1}$ LHSV, and about 0.5 hr$^{-1}$ to about 1.5 hr$^{-1}$. Additionally, a hydrogen gas rate of from 35.6 m$^3$/m$^3$ to 1781 m$^3$/m$^3$ (200 scf/B to 10,000 scf/B) can be used.

Base Stocks

Base stocks are materials which are typically a fluid at the operating temperature of the lubricant and used to formulate a lubricant by admixing with other components. As described herein, non-limiting examples of base stocks suitable in lubricants include API Group I, Group II, Group III, Group IV, and Group V base stocks.

Base stocks are generally classified into two broad types-naphthenic and paraffinic-depending on the crude types they are derived from. Naphthenic crudes are characterized by the absence of wax or have very low levels of wax. Therefore, naphthenic crudes are largely cycloparaffinic and aromatic in composition. Furthermore, naphthenic lube fractions without any dewaxing are generally liquid at low temperatures. On the other hand, paraffinic crudes contain cycloparaffins, aromatics and wax; wax being largely n- and iso-paraffins which have high melting points.

The base stock can be a natural oil or a combination of natural oils. Natural oils (or mixtures thereof) can be used unrefined, refined, or re-refined (the latter is also known as reclaimed or reprocessed oil). Unrefined oils are those obtained directly from a natural source and used without added purification. These include shale oil obtained directly from retorting operations, petroleum oil obtained directly from primary distillation, and ester oil obtained directly from an esterification process. Refined oils are similar to unrefined oils except refined oils are subjected to one or more purification steps to improve the at least one lubricating oil property.

To produce the base stock, in accordance with the various embodiments of the invention, process steps can include solvent extraction, secondary distillation, acid extraction, base extraction, filtration, percolation, oligomerization and dimerizations of olefins including poly alpha olefins, poly internal olefins and bio-derived base stocks. Re-refined oils are obtained by processes analogous to refined oils but using an oil that has been previously used as a feedstock. Natural oils vary as to the method used for their production and purification, for example, their distillation range and whether they are straight run or cracked, hydrorefined, or solvent extracted. Feedstock can also include used oils, pretreated oils and other recycled materials.

Also, natural oils can include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic.

Groups I, II, III, IV and V are broad categories of base stocks. See e.g., API Publication 1509. Group I base stocks generally have a viscosity index of from 80 to 120 and contain greater than 0.03% sulfur and less than 90% saturates. Group II base stocks generally have a viscosity index of from 80 to 120 and contain less than or equal to 0.03% sulfur and greater than or equal to 90% saturates. Group III base stocks generally have a viscosity index greater than 120 and contains less than or equal to 0.03% sulfur and greater than 90% saturates. Group IV base stocks include polyalphaolefins. Group V base stocks include base stocks not included in Groups I-IV. Table 1 below summarizes properties of each of these five groups.

TABLE 1

Base Stock Properties

| | Saturates | Sulfur | Viscosity Index |
|---|---|---|---|
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | | Includes PAO products | |
| Group V | | All other base stocks not included in Groups I, II, III, or IV | |

Group II and/or Group III base stocks are hydroprocessed and/or hydrocracked base stocks. According to various embodiments, the base stock is a Group II or a Group II base stock or a blend of base stocks, including for example, without limitation, multiple Group II and/or Group III base stocks. According to various embodiments of the present invention, a Group II and/or Group III base stock can be used in combination with a synthetic oil. Synthetic oils include hydrocarbon oil such as polymerized and interpolymerized olefins such as polybutylenes, polypropylenes, propylene isobutylene copolymers, ethylene-olefin copolymers, and ethylene-alpha-olefin copolymers, for example. Polyalpha-olefin oil base stocks, the Group IV API base stocks, can be used as base stock. By way of example, PAOs derived from $C_8$, $C_{10}$, $C_{12}$, $C_{14}$ olefins or mixtures thereof can be utilized. See U.S. Pat. Nos. 4,956,122; 4,827,064; and 4,827,073. Group IV hydrocarbons and base stocks have viscosity indices greater than about 130, greater than about 135, and greater than about 140.

As described herein, the present lube feed stock can comprise one or more base stocks. The base stock can have a kinematic viscosity at 100° C. ("KV100"), measured according to ASTM standard D-445, from about 4.0 cSt to about 7.0 cSt, about 5.0 cSt to about 6.0 cSt. Base stocks can have a kinematic viscosity at 40° C. ("KV40"), measured according to ASTM standard D-445, from about 18 cSt to about 42 cSt and from about 15 cSt to about 40 cSt. The base stocks have a viscosity index, calculated according to ASTM standard D-2270, from about 80 to about 150 and from about 105 to about 142.

Base stocks can have a NOACK volatility of no greater than about 35%, preferably no greater than about 30%, and more preferably no greater than about 25%. Base stock can have a Noack volatility of between about 7.0 wt. % to about 15.0 wt. %. As used herein, Noack volatility is determined by ASTM D-5800.

Additionally, or alternatively, the base stocks can have a pour point of less than about −20° C., less than about −40° C., less than about −50° C., less than about −60° C. Also, the base stocks can have a pour point of between about −15° C. and −60° C.

Molecular Sieve Membrane

Provided herein are molecular sieve membranes for separating hydrocarbons of a lube feed stock into a permeate and a retentate based on molecular shape. The molecular sieve membrane 100 comprises one or more layers of a size-selective catalyst and a porous support. As shown in FIG. 1B, each layer of size-selective catalyst has a plurality of perpendicular membrane channels 12 and a plurality of opening pores 14 and a porous support 22 comprising a plurality of diffusing gaps. The plurality of perpendicular membrane channels 12 are in fluidic communication with the plurality of opening pores 14. The perpendicular membrane channels 12 are also perpendicular to the direction of flow of the lube feed stock 16.

The porous support 22 is in fluidic communication with the plurality of opening pores providing a fluidic pathway between the perpendicular membrane channels and the diffusing gaps. Hence, the molecular sieve membrane 100 is configured for cross-flow of the lube feed stock over the molecular sieve membrane 100 causing a continuous flow of the permeate into the perpendicular membrane channels 12 through the plurality of opening pores into and out of the diffusing gaps of the porous support 22.

In accordance with various embodiments of the invention, the molecular sieve membrane 100 comprises multilayers of one or more size-selective catalyst. For example, a thinner layer of size-selective catalyst can be used as a surface of the molecular sieve membrane 100 and the porous support 22 can be another layer of different size-selective catalyst for mechanical stability. In an aspect, the molecular sieve membrane 100 is tubular.

Size selection is based on selection of the size-selective catalyst and an opening pore provided thereby. In an aspect, the size-selective catalyst comprises zeolite or mordenite. In an aspect, the porous support comprises graphite, clays and/or two-dimensional ionic conductors. In an aspect, the porous support is a single layer. In an aspect, the porous support is a coating.

FIG. 1A shows flow of the lube feed stock 16 to a membrane 60 that does not have membrane channels. This membrane has a plurality of opening pores 14 in fluidic communication with one dimensional pore spaces 62. The molecular sieve membrane 60 can be configured in a dead-end geometry so that the direction of flow of the lube feed stock 16 is tangential to the one dimensional pore spaces 62. The geometry and one-dimensionality of the membrane shown in FIG. 1A create a risk of short term deactivation. For example, a molecule 18 having linear and ringed components can partially diffuse into the dimensional pore space 62, be partially blocked, and then diffuse back out, temporarily deactivating the one dimensional pore space 62 in the process.

By contrast, the molecular sieve membrane 100 according to the present invention as shown in FIG. 1B has a plurality of opening pores 14 in fluidic communication with perpendicular membrane channels 12 configured in cross-flow geometry where channels 12 are positioned perpendicular to the direction of flow of the lube feed stock 16. More of each lube molecule is therefore exposed to the size selective pore, so that the large portion of molecules (such as molecule 18) more readily prevent its diffusion into the pore. Also, that pore shape allows easier diffusion of the small portion of molecule 18 back out of the pore. Therefore, short term deactivation is mitigated, reducing the probability that a molecule 18 will diffuse into the perpendicular membrane channels 12 and deactivate the molecular sieve membrane 100.

In an aspect, as shown in FIG. 2, the molecular sieve membrane 100 can be spirally wound. Feed spacers 30 can allow for uniform flow of the lube feed stock 16 through the molecular sieve membrane 100. Permeate spacers 32 separate the molecular sieve membrane 100 from a permeate collector 34. As lube feed stock flows over the molecular sieve membrane, the permeate (not shown) separates from the retentate (not shown). The permeate then flows through the molecular sieve membrane 100 into the permeate collector 34.

In an aspect, the size-selective catalyst comprises zeolite or mordenite. In an aspect, the size-selective catalyst comprises a crystal structure of ZSM48 and/or mordenite. In an aspect, each of the perpendicular membrane channels is between about four (4) Angstroms to about ten (10) Angstroms. In an aspect, each of the perpendicular membrane channels is between about four (4) Angstroms to about eight (8) Angstroms. In an aspect, each of the perpendicular membrane channels is between about four (4) Angstroms to about six (6) Angstroms. In an aspect, the porous support comprises graphite, clays and/or two-dimensional ionic conductors. In an aspect, the porous support is a single layer. In an aspect, the porous support is a coating.

In an aspect, the molecular sieve membrane is not acidic as determined by titration, ammonia adsorption, pyridine adsorption, or a combination thereof, as described in B C Gates, J R Katzer, and G C A Schuit, *Chemistry of Catalytic Processes*, Ch. 1, McGraw Hill (1979). In an aspect, the membrane is tubular. In an aspect, the molecular sieve membrane is configured to separate wax from lube oil. In an aspect, the membrane channels are two dimensional in shape.

Long term deactivation or fouling is overcome by using feeds that are clean due to previous processing. Short term fouling or deactivation can be mitigated with a membrane with a cross-flow type geometry (perpendicular to slot) and slotted channel rather than use of a one-dimensional pore.

Paraffins passing through molecular sieves can be isomerized from n-paraffins into iso-paraffins as shown. Isomerization activity within the molecular sieve membrane can be minimized by lowering the acidity of the molecular sieve membrane. Isomerization activity can also be minimized by reducing the operating temperature to avoid kinetic activity of the size-selective catalyst. In an aspect, the molecular sieve membrane is configured to separate linear from branched molecules. In an aspect, the molecular sieve membrane is configured to separate wax from lube oil. In an aspect, the molecular sieve membrane is configured to separate paraffins from ring molecules.

As used herein, the term "acidity" refers to the concentration of acid sites, regardless of the strength of such acid sites which can be measured by ammonia absorption. Acidity as applied to molecular sieve membranes and zeolites is known to persons skilled in the art. The acidic properties of zeolites are well known. Acid sites of a zeolite can be Bronsted acid sites or Lewis Acid sites. The density of the acid sites and the number of acid sites are important in determining the acidity of the zeolite. Factors directly influencing the acid strength are (i) the chemical composition of the zeolite framework, i.e., relative concentration and type of tetrahedral atoms, (ii) the concentration of the extra-framework cations and the resulting extra-framework species, (iii) the local structure of the zeolite, e.g., the pore size and the location, within the crystal or at/near the surface of the zeolite, and (iv) the pretreatment conditions and presence of co-adsorbed molecules. The amount of acidity is related to the degree of isomorphous substitution provided, however, such acidity is limited to the loss of acid sites for a pure $SiO_2$ composition.

Molecular sieve membranes according to the present invention can be prepared using a seeded growth synthesis, or secondary growth, as described in Kim et al., *Seeded Growth, Silylation, and Organic Water Separation Properties of MCM-48 Membranes*, 427 J MEMBR SCI 293 (2013), incorporated herein by reference, or by using exfoliated zeolite nanosheets as described in Varoon et al., *Dispersible Exfoliated Zeolite Nanosheets and Their Application as a Selective Membrane*, 334 SC 72 (2011), incorporated herein by reference.

Separation Processes Using the Present Molecular Sieve Membranes

Processes for separating n-paraffins from other hydrocarbons are provided herein. The process comprises the steps of (a) providing a lube feed stock comprising a plurality of n-paraffins and a plurality of ring molecules; (b) contacting the lube feed stock with the molecular sieve membrane of claim 1; and (c) separating the permeate to produce a wax product without solvent, wherein the permeate comprises the plurality of n-paraffins and the retentate comprises the plurality of ring molecules. In an aspect, the lube feed stock is a waxy intermediate. In an aspect, the hydrocarbons comprise a plurality of paraffins and a plurality of ring molecules and the plurality of paraffins are separated from the plurality of ring molecules.

Further provided herein are processes for separating paraffins in a hydrotreated hydrocarbon stream comprising the steps of: (a) providing a hydrotreated hydrocarbon stream comprising paraffins, aromatics and/or other multi-ring hydrocarbon compounds; (b) contacting the hydrotreated hydrocarbon stream with the present molecular sieve membrane; and (c) separating the paraffins to provide a wax product feed stream for catalytic dewaxing, and a stream of fuel or lube by-products. A solvent is not required in the separation process. In an aspect, the wax product stream comprises paraffins, 1-ring naphthenes, and ringed aromatics and the lube product stream comprises multi-ring naphthenes.

For the present processes, the lube feed stock can comprise Group II+ base stock. In an aspect, the present processes are carried out in blocked mode operation. In an aspect, the process is carried out at an operating temperature that is greater than a cloud point of the lube feed stock. In an aspect, the process is carried out at an operating temperature of about 100° C. or about 200° C. or about 300° C. to minimize isomerization activity depending on the catalytic activity of the membrane. In an aspect, the process further comprises the step of pretreating the molecular sieve membrane to minimize acidity of the molecular sieve membrane.

In an aspect, the permeate has a volume between about 65 vol % and about 75 vol % of a clean Group I, Group II, or Group III lube base stock and the retentate has a volume between about 25 vol % and about 35 vol % of the clean Group I, Group II, or Group III lube base stock. In an aspect, the permeate comprises paraffins in a volumetric amount of about 45 vol % of the clean Group I, Group II, or Group III lube base stock and comprises 1-ring naphthene in a volumetric amount of about 25 vol % of the clean Group I, Group II, or Group III lube base stock and the retentate comprises multi-ring naphthene and mono-aromatics in a volumetric amount of about 30 vol % of the clean Group I, Group II, or Group III lube base stock. In an aspect, the permeate has good oxidative stability by such testing as Sequence III-G automotive engine oil test and the Turbine Oil Oxidation Stability Test when blended with appropriate antioxidant and other additives.

The present processes are useful in separating n-paraffins from iso-paraffins, paraffins from single ring molecules from multi-ring molecules, such as multi-ring naphthenes. In an aspect, a wax product stream (permeate) comprises normal paraffins and the lube product stream (retentate) comprises multi-ring naphthenes. In an aspect, the wax product stream will comprise paraffins, 1-ring naphthenes, and mono-aromatics.

Conventional extraction and dewaxing processes include solvents. However, the present processes described herein are carried out without use of solvent. Paraffins and single ring naphthenes have good oxidative stability. Therefore, processes for separating using the present molecular sieve membrane provides excellent solvency and oxidative stability in the permeate without use of solvents.

Figure 3:
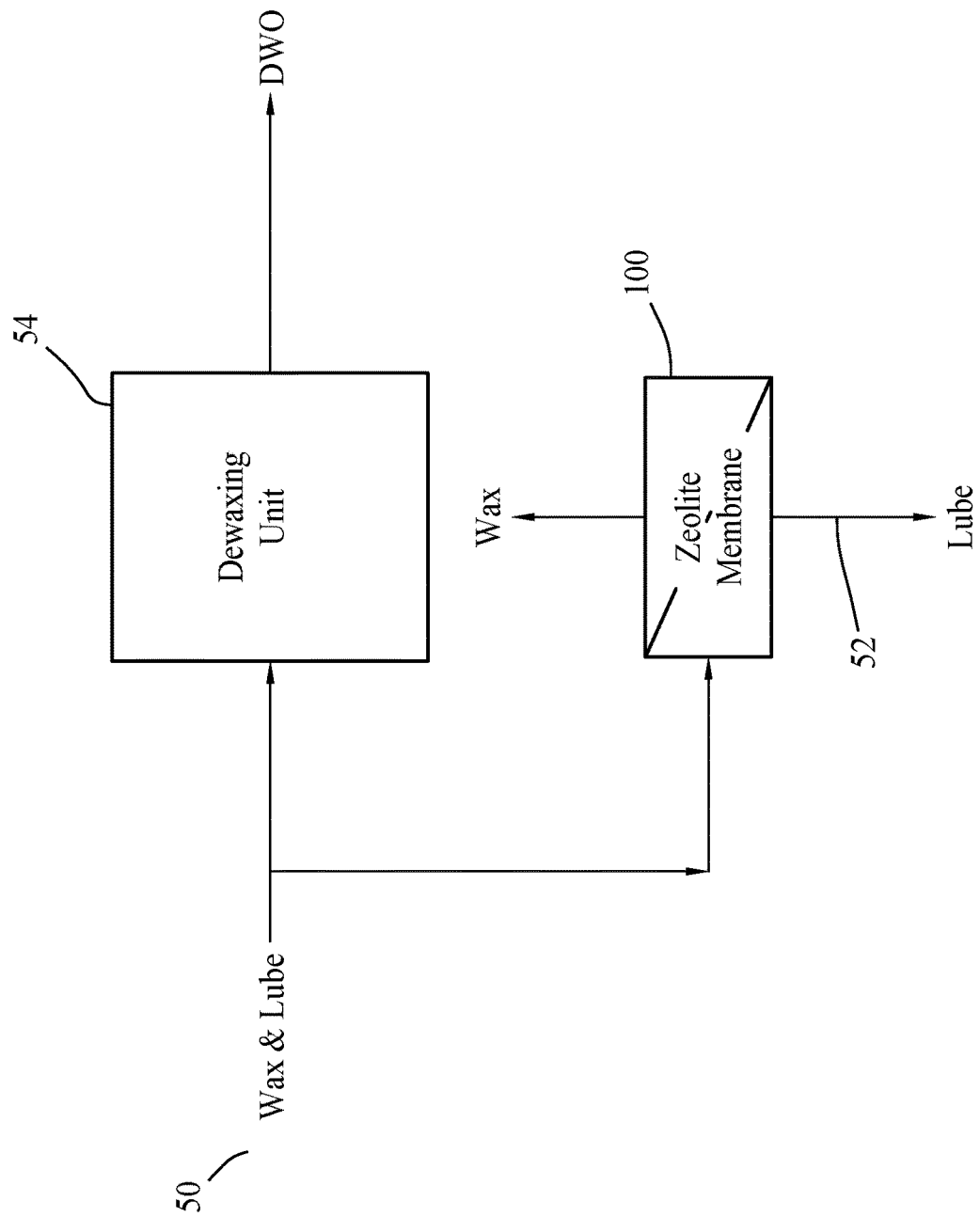
FIG. 3 depicts an application of the present molecular sieve membrane without interruption of dewaxing unit.

As shown in FIG. 3, in production, a lube base stock 50 ready for catalytic dewaxing is diverted from a catalytic dewaxing unit 54 to the molecular sieve membrane 100. The resulting product stream 52 (retentate) comprises a reduced wax lube feed stock having reduced wax content. Because of a reduction in wax, catalytic dewaxing processes can operate less severely, at lower operating temperature, lowering operation costs and increasing saturation of aromatic molecules. Blocked mode operation of the molecular sieve membrane 100 allows for continuous production without interruption of the catalytic dewaxing process.

The processes described herein advantageously allow for high yield due to selectivity. Additionally, rejection of ring molecules from the lube product stream is advantageous because it allows for higher margins and process step improvements.

Additional features of the invention are described in the following non-limiting examples.

Example 1

To approximate separation by molecular shape, Group II+ lube base stock was characterized by thermal diffusion. As provided in Tables 2A and 2B immediately below, Group TF lube base stock samples were taken in 100 thermal gradient increments and pour point, kinematic viscosity at 40° C., kinematic viscosity at 100° C., and viscosity index were measured for each sample. Pour point was measured according to ASTM D5950. Kinematic viscosity at 40° C. and kinematic viscosity at 100° C. were each measured according to ASTM D445. Viscosity index was measured according to ASTM D2270.

TABLE 2A

| Thermal Gradient/ Sample | 10% | 20% | 30% | 40% | 50% | 60% | 70% |
|---|---|---|---|---|---|---|---|
| Pour Point | 5 | −12 | −18 | −30 | −39 | −58 | −79 |
| Kinematic | 11.7 | 13.3 | 14.8 | 16.6 | 18.2 | 20.8 | 24.8 |

TABLE 2A-continued

| Thermal Gradient/ Sample | 10% | 20% | 30% | 40% | 50% | 60% | 70% |
|---|---|---|---|---|---|---|---|
| Viscosity 40 C. Kinematic | 3.3 | 3.5 | 3.7 | 3.9 | 4.1 | 4.4 | 4.7 |
| Viscosity 100 C. Kinematic | | | | | | | |
| Viscosity Index | 165.5 | 155.9 | 143.5 | 132.6 | 128.6 | 119.9 | 109.7 |
| Cumulative Viscosity Index | 166 | 161 | 155 | 149 | 145 | 141 | 137 |

TABLE 2B

| Thermal Gradient/ Sample | 80% | 90% | 100% | Ave | measured |
|---|---|---|---|---|---|
| Pour Point | −79 | −79 | −79 | −46.8 | −18 |
| Kinematic Viscosity 40 C. | 30.7 | 46.3 | 107.3 | 30.45 | 22.1 |
| Kinematic Viscosity 100 C. | 5.2 | 6.2 | 9.125 | 4.8125 | 4.5 |
| Viscosity Index | 97.4 | 71.8 | 35.3 | 116.02 | 117 |
| Cumulative Viscosity Index | 132 | 125 | 116 | | |

Data provided in Tables 2A and 2B show that along the thermal gradient, kinematic viscosity of the base stock increases while pour point and viscosity index decrease.

Also, for each sample, composition by volume was measured. Tables 3A and 3B provide volumetric amounts of paraffins, ringed naphthenes and mono-aromatics which were measured by ASTM D2786 mass spectrometry.

TABLE 3A

| Thermal Gradient/ Sample | 10% | 20% | 30% | 40% | 50% | 60% | 70% |
|---|---|---|---|---|---|---|---|
| Paraffins | 84 | 74.3 | 70 | 64.9 | 58.9 | 49.5 | 35.2 |
| 1-ring naphthenes | 11.7 | 19.1 | 21.7 | 23.5 | 25.9 | 29.8 | 36 |
| 2-ring naphthenes | 1.7 | 3.4 | 4.8 | 7.5 | 10.2 | 14 | 18.4 |
| 3-ring naphthenes | 0.4 | 0.4 | 0.5 | 0.6 | 1.1 | 2.2 | 4.7 |
| 4-ring naphthenes | 0.1 | 0.1 | 0.1 | 0.2 | 0.4 | 0.5 | 0.5 |
| 5-ring naphthenes | 0 | 0 | 0 | 0 | 0 | 0 | 0 |
| 6-ring naphthenes | 0 | 0 | 0 | 0 | 0 | 0 | 0 |
| Mono-aromatics | 2.1 | 2.7 | 2.9 | 3.2 | 3.5 | 4 | 5.2 |

TABLE 3B

| Thermal Gradient/ Sample | 80% | 90% | 100% | Volume | Cumulative Volume |
|---|---|---|---|---|---|
| Paraffins | 20.3 | 1.7 | 0 | 45.88 | 45.9 |
| 1-ring naphthenes | 37.5 | 33.5 | 10 | 24.87 | 70.8 |
| 2-ring naphthenes | 25.9 | 32.4 | 22.8 | 14.11 | 84.9 |
| 3-ring naphthenes | 8.8 | 17.7 | 23.4 | 5.98 | 90.8 |
| 4-ring naphthenes | 1.4 | 5.3 | 16.7 | 2.53 | 93.4 |
| 5-ring naphthenes | 0 | 0.8 | 8.6 | 0.94 | 94.3 |
| 6-ring naphthenes | 0 | 0 | 5.4 | 0.54 | 94.9 |
| Mono-aromatics | 6.2 | 8.6 | 13.1 | 5.15 | 100 |

As shown by data provided in Tables 3A and 3B, across a thermal diffusion gradient, the amount of paraffins by volume in the base stock sample decreased while the amount of ringed naphthenes in the base stock increased, indicating that waxy linear paraffins could be selectively removed from a lube base stock. Also, there was an increasing volume of ringed naphthenes in the base stock as the thermal diffusion gradient increased.

After thermal diffusion, retentate containing multi-ring naphthenes and mono-aromatics was backblended with Group III+ base stock to raise the viscosity index of the retentate. Furthermore, Group I1+ base stock was backblended with Group III+ base stock to increase volume. Results are provided in Table 4 below.

TABLE 4

| | volume | Cumulative volume | Viscosity Index after Ushio | Permeate Cumulative Viscosity Index | Retentate Cumulative Viscosity Index | Viscosity Index Ushio via Lynch |
|---|---|---|---|---|---|---|
| Paraffins | 45.88 | 45.9 | 158 | 158.0 | 116.6 | 165 |
| 1-ring naphthenes | 24.87 | 70.8 | 135 | 149.9 | 81.5 | 142 |
| 2-ring naphthenes | 14.11 | 84.9 | 65 | 135.8 | 36.0 | 70 |
| 3-ring naphthenes | 5.98 | 90.8 | 20 | 128.2 | 8.9 | |
| 4-ring naphthenes | 2.53 | 93.4 | −25 | 124.0 | 1.6 | |
| 5-ring naphthenes | 0.94 | 94.3 | −70 | 122.1 | 11.8 | |
| 6-ring naphthenes | 0.54 | 94.9 | −115 | 120.7 | 25.3 | |
| Mono-aromatics | 5.15 | 100.0 | 40 | 116.6 | 40.0 | 50 |
| | | | 116.6 | | | |

As provided in Table 4, the values for viscosity index Ushio via Lynch were taken from Table 3.4 in Thomas R. Lynch, Process Chemistry of Lubricant Base Stocks, 58 (James G. Speight ed., 2008), incorporated herein by reference. Values for viscosity index after Ushio were initially also taken from Table 3.4 of Lynch. Values for paraffins, 1- and 2-ring naphthenes, and mono-aromatics were subsequently adjusted to fit the viscosity index of each sample, while the values for 3+-ring naphthenes were extrapolated accordingly.

After thermal diffusion, a retentate comprising multi-ring naphthenes and mono-aromatics was backblended with Group III+ base stock to increase viscosity index. In addition, Group II+ base stock was backblended with the Group III+ base stock to increase volume to provide examples of feed and product yields. The results of this blending are provided in Table 5 below.

TABLE 5

| | Volume | Viscosity Index |
|---|---|---|
| Backblend Group III+ to raise retentate to viscosity index of 95 | | |
| Group III+ | 8 | 149.9 |
| Retentate | 29 | 81.5 |
| Retentate Blend | 37 | 96.3 |
| Group III+ remaining | | 62.8 |
| Backblend Group II+ into Group III+ to swell volume | | |
| Group III+ | 63 | 149.9 |
| Retentate | 25 | 116.0 |
| Group III+/II+ Blend | | 140.3 |

In addition to data presented in Table 5, Group III+ yield on membrane feed was 70.4. Thermal diffusion roughly approximates a separation of molecules by shape. Our preliminary results show that feedstock can be effectively separated by shape such as via a membrane.

Example 2

Figure 4:
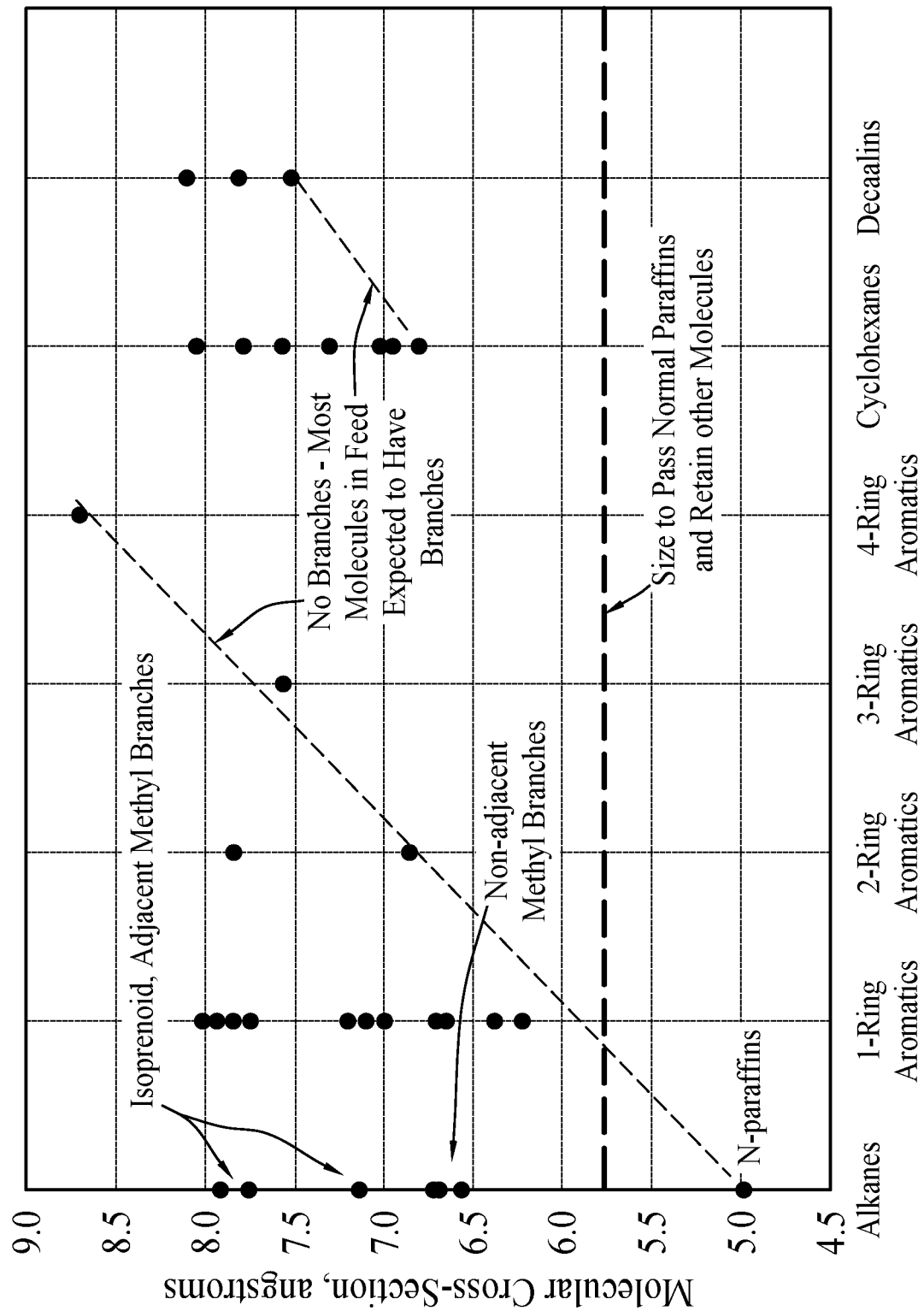
FIG. 4 is a plot showing the separation of n-paraffins from other molecules based on molecular size.
Figure 5:
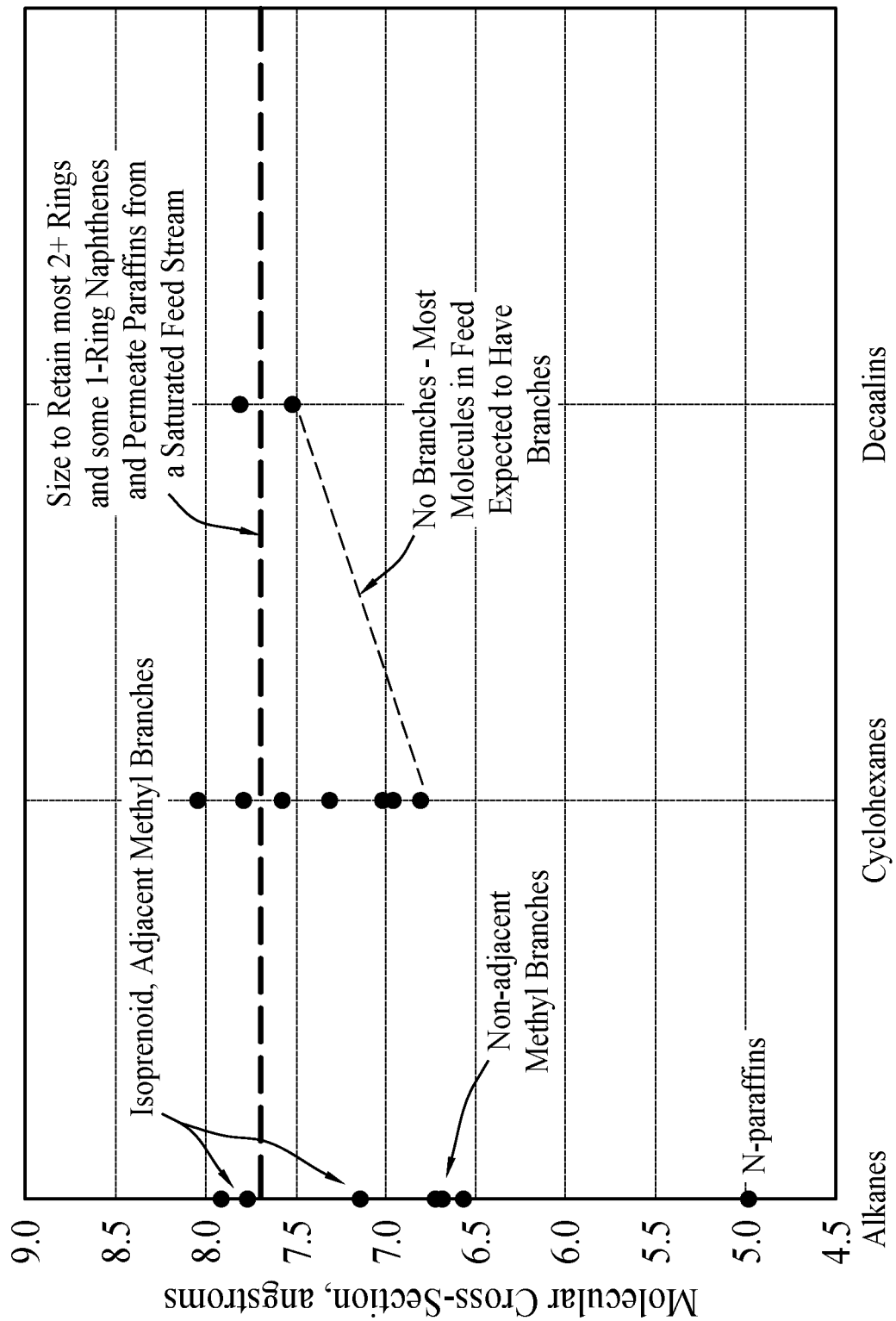
FIG. 5 is a plot showing the separation of alkanes from 2+ ring naphthenes in a blend of saturated hydrocarbons.
Figure 6:
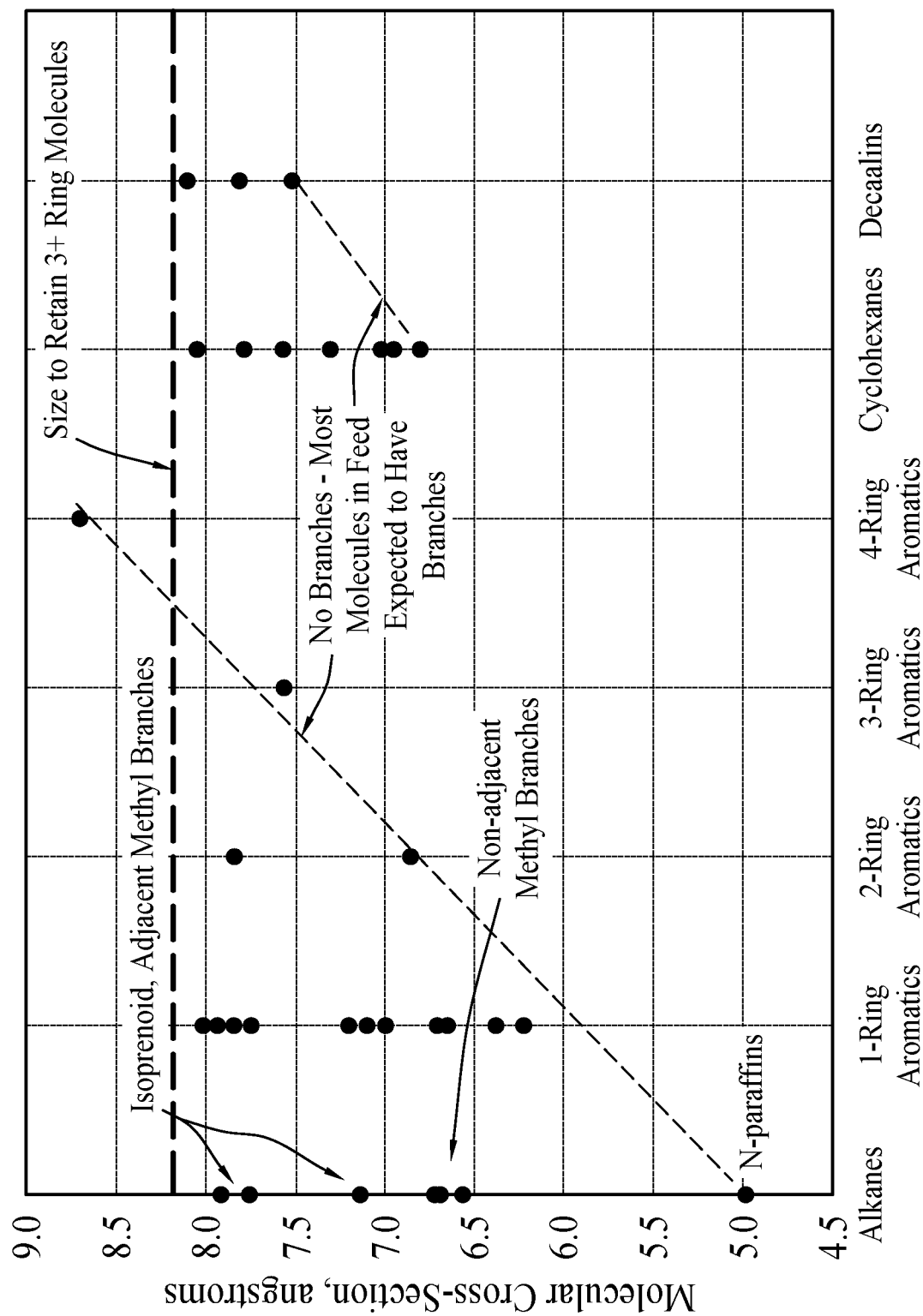
FIG. 6 is a plot showing separation of 3+ ring molecules in a mixture of hydrocarbons that includes alkanes, cyclohexanes and decalins.

In order to demonstrate and anticipate separation based on molecular size, several plots showing the separation of n-paraffins from other molecules. FIGS. 4, 5, and 6.

Molecular dimensions in angstroms of various hydrocarbons were taken from Wu, E. L. et al., *Hydrocarbon Adsorption Characterization of Some High Silica Zeolites*, 28 STUDIES IN SURFACE SCI. AND CATALYSIS, 547-54 (1986).

TABLE 6

| | Height, A | Width, A | Length, A | Approximate Courtald diameter, A |
|---|---|---|---|---|
| n-Hexane | 3.9 | 4.3 | 9.1 | 4.98 |
| 2-Methylpentane | 4.4 | 6.1 | 8.3 | 6.69 |
| 3-Methylpentane | 4.6 | 5.8 | 8.6 | 6.56 |
| 2,3-Dimethylbutane | 4.6 | 6 | 7 | 6.73 |
| 2,2-Dimethylbutane | 5.9 | 6.2 | 6.7 | 7.77 |
| 2,3,4-Trimethyldecane | 5.3 | 6.9 | 0 | 7.92 |
| Pristane (C19 biomarker) | 4.6 | 6.5 | 0 | 7.14 |
| Cyclopentane | 3.6 | 5.6 | 6.2 | 5.82 |
| Cyclohexane | 4.7 | 6.2 | 6.9 | 6.95 |
| 1,4-Dimethylcyclohexane | 4.6 | 6.1 | 8.9 | 6.81 |
| 1,3-Dimethylcyclohexane | 4.6 | 6.7 | 8.6 | 7.31 |
| 1,2-Dimethylcyclohexane | 4.6 | 7 | 7.5 | 7.57 |
| n-Alkylcyclohexane | 4.8 | 6.2 | 0 | 7.01 |
| n-Alkylcyclopentane | 5.6 | 5.7 | 0 | 7.17 |
| 1-Methyl-4-alkylcyclohexane | 4.8 | 6.2 | 0 | 7.01 |
| 1-Methyl-3-alkylcyclohexane | 4.8 | 7.4 | 0 | 8.04 |
| 1-Methyl-2-alkylcyclohexane | 5.6 | 6.5 | 0 | 7.79 |
| Cis-decalin | 5.2 | 6.5 | 8.9 | 7.52 |
| Trans-decalin | 5 | 7 | 8.8 | 7.81 |
| n-alkyl-trans-decalin | 5.2 | 7.2 | 0 | 8.11 |
| Benzene | 3.4 | 6.2 | 6.9 | 6.23 |
| Toluene | 3.7 | 6.2 | 7.8 | 6.38 |
| p-Xylene | 3.7 | 6.2 | 8.6 | 6.38 |
| m-Xylene | 3.7 | 6.9 | 8.5 | 7.00 |
| o-Xylene | 4.1 | 6.9 | 7.5 | 7.21 |
| Ethylbenzene | 4.2 | 6.2 | 8.8 | 6.65 |
| n-Alkylbenzene | 4.3 | 6.2 | 0 | 6.71 |
| 1,2,3-trimethylbenzene | 4.1 | 7.5 | 7.8 | 7.75 |
| 1,2,4-trimethylbenzene | 4.1 | 7.5 | 8.6 | 7.75 |
| 1,3,5-trimethylbenzene | 3.7 | 7.8 | 8.5 | 7.84 |
| 1-Methyl-3-alkylbenzene | 3.9 | 6.9 | 0 | 7.10 |
| 1-Methyl-2-alkylbenzene | 3.9 | 7.8 | 0 | 7.94 |
| Isoprenoidal benzene | 4.6 | 7.5 | 0 | 8.02 |
| Naphthalene | 3.4 | 6.9 | 8.8 | 6.86 |
| 9-methyl-naphthalene | 3.7 | 7.8 | 0 | 7.84 |
| Phenanthrene | 3.5 | 7.6 | 11.4 | 7.56 |
| Pyrene | 3.4 | 8.8 | 11.4 | 8.71 |

FIG. 4 is a plot of a molecular cross-section for the hydrocarbons presented in Table 6. Molecule size in angstroms was plotted against type of molecule, specifically, alkanes, 1-aromatics, 2-aromatics, 3-aromatics, 4-aromatics, cyclohexanes and decalins. From the plot, a size of the channel for separation of normal paraffins (n-paraffins) from other hydrocarbons through the molecular sieve membrane is shown to be about 5.75 angstroms. Also shown, a majority of molecules in the lube feed stock can be expected to have branches.

FIG. 5 is a plot showing a probable separation of alkanes from 2+ ring naphthenes in a blend of saturated hydrocarbons using the molecular sieve membrane. As shown, at a size of about 7.5 angstroms, the perpendicular channel of the molecular sieve membrane could be sized to retain most 2+ ring aromatics and some 1-ring naphthenes in the lube stock feed (a stream of saturated hydrocarbons) as retentate. Further, as shown, 1-ring aromatics could be split between the permeate and the retentate.

FIG. 6 is a plot to depict a probable separation of 3+ ring molecules in the lube feed stock comprising a mixture of hydrocarbons. As shown, at a size of about 8.0 angstroms, the perpendicular channel of the molecular sieve membrane would be sized to retain the majority of 3+ ring aromatics and 3+ ring naphthenes and a certain amount of 2+ ring naphthenes as the retentate from the mixture of hydrocarbon (lube feed stock).

Table 7 contains crystallite size, crystallographic pore size and channel dimensionality of zeolite samples previously measured. When zeolites are used as the size-selective catalyst in the molecular sieve membrane, it appears that sizes and shape selectivity of ZSM-48 and mordenite would be particularly useful.

TABLE 7

| Sample | Crystallite Size (μm) | Crystallographic Pore Size (nm) | Channel Dimensionality |
|---|---|---|---|
| Linde 5A | 2 | 0.41 | 3 |
| ZSM-23 | 0.4 | 0.45 × 0.56 | 1 |
| ZSM-11 | <0.1 | 0.51 × 0.55 | 2 |
| ZSM-5 L | >2 | 0.51 × 0.55 | 2 |
| ZSM-5 M | 0.5 | And | |
| ZSM-5 S | <0.1 | 0.54 × 0.56 | |
| ZSM-48 | 2 | 0.53 × 0.56 | 1 |
| ZSM-12 | 0.2 | 0.57 × 0.61 | 1 |
| Mordenite | 0.5 | 0.67 × 0.70 | 1 |
| Zeolite Y | 0.5 | 0.74 | 3 |

In Table 7, L, M, and S denotes the crystallite as large, medium, and small. For ZSM-11 and ZSM-5, two channels will intersect, allowing adsorbates to move in a third dimension.

The composition of the lube feed stock and the base stocks can be determined by $^{13}$C NMR spectroscopy. THOMAS R. LYNCH, PROCESS CHEMISTRY OF LUBRICANT BASE STOCKS, 88-97, 362-65 (James G. Speight ed., 2008), incorporated herein by reference. A composition of the base stock can also be determined using the n-d-M method. LYNCH, supra., 75-88, incorporated herein by reference. The components of the lube feed stock and the base stock can further be determined by mass spectrometry, such as by ASTM D2786. K. H. ALTGELT & M. M. BODUSZYNSKI, COMPOSITION AND ANALYSIS OF HEAVY PETROLEUM FRACTIONS, 257-304 (New York: Marcel Dekker, 1993), incorporated herein by reference.

Additional Embodiments

Clause 1. A molecular sieve membrane for separating hydrocarbons of a lube feed stock into a permeate and a retentate based on molecular shape comprising: one or more layers of size-selective catalyst, each layer of size-selective catalyst having a plurality of perpendicular membrane channels and a plurality of opening pores, wherein the plurality of perpendicular membrane channels is in fluidic communication with the plurality of opening pores; and a porous support comprising a plurality of diffusing gaps, wherein the porous support is in fluidic communication with the plurality of opening pores providing a fluidic pathway between the perpendicular membrane channels and the diffusing gaps, and the molecular sieve membrane is configured for cross-flow of the lube feed stock over the molecular sieve membrane causing a continuous flow of the permeate into the perpendicular membrane channels through the plurality of opening pores into and out of the diffusing gaps of the porous support.

Clause 2. The molecular sieve membrane of Clause 1, wherein the size-selective catalyst comprises zeolite or mordenite.

Clause 3. The molecular sieve membrane of Clause 1, wherein the porous support comprises graphite, clays and/or two-dimensional ionic conductors.

Clause 4. The molecular sieve membrane of Clause 1, wherein the porous support is a single layer.

Clause 5. The molecular sieve membrane of Clause 1, wherein the porous support is a coating.

Clause 6. The molecular sieve membrane of Clause 1, wherein the size-selective catalyst comprises a crystal structure of ZSM48 and/or mordenite.

Clause 7. The molecular sieve membrane of Clause 1, wherein each of the perpendicular membrane channels is between about 4 Angstroms to about 10 Angstroms.

Clause 8. The molecular sieve membrane of Clause 1, wherein each of the perpendicular membrane channels is between about 4 Angstroms to about 8 Angstroms.

Clause 9. The molecular sieve membrane of Clause 1, wherein each of the perpendicular membrane channels is between about 4 Angstroms to about 6 Angstroms.

Clause 10. The molecular sieve membrane of Clause 1, wherein the molecular sieve membrane is not acidic as determined by titration, ammonia adsorption, pyridine adsorption, or a combination thereof.

Clause 11. The molecular sieve membrane of Clause 1, wherein the membrane is tubular.

Clause 12. The molecular sieve membrane of Clause 1, wherein the molecular sieve membrane is configured to separate wax from lube oil.

Clause 13. The molecular sieve membrane of Clause 1, wherein the membrane channels are two dimensional in shape.

Clause 14. The molecular sieve membrane of Clause 1, wherein the hydrocarbons comprise a plurality of paraffins and a plurality of ring molecules and the plurality of paraffins are separated from the plurality of ring molecules.

Clause 15. A process for separating n-paraffins from other hydrocarbons comprising the steps of: providing a feed stock comprising a plurality of n-paraffins and a plurality of ring molecules; contacting the feed stock with the molecular sieve membrane of Clause 1; and separating the permeate to produce a wax product without solvent, wherein the permeate comprises the plurality of n-paraffins and the retentate comprises the plurality of ring molecules.

Clause 16. The process of Clause 15 where the feed stock is a waxy intermediate.

Clause 17. A process for separating paraffins in a hydrotreated hydrocarbon stream comprising the steps of: providing a hydrotreated hydrocarbon stream comprising paraffins, aromatics and/or other multi-ring hydrocarbon compounds; contacting the hydrotreated hydrocarbon stream with the molecular sieve membrane of Clause 1; and separating the paraffins to provide a wax product feed stream for catalytic dewaxing, and a stream of fuel or lube by-products, wherein solvent is not used in the separation process.

Clause 18. The process of any one of the preceding Clauses, wherein the wax product stream comprises paraffins, 1-ring naphthenes, and ringed aromatics and the lube product stream comprises multi-ring naphthenes.

Clause 19. The process of any one of the preceding Clauses, wherein the lube feed stock comprises Group II+ base stock.

Clause 20. The process of any one of the preceding Clauses, wherein the permeate or retentate comprises a Group III+ base stock.

Clause 21. The process of any one of the preceding Clauses, wherein the process is carried out in blocked mode operation.

Clause 22. The process of any one of the preceding Clauses, wherein process is carried out at an operating temperature of about 100° C. to minimize isomerization activity.

Clause 23. The process of any one of the preceding Clauses, wherein process is carried out at an operating temperature of about 200° C. to minimize isomerization activity.

Clause 24. The process of any one of the preceding Clauses, wherein process is carried out at an operating temperature of about 300° C. to minimize isomerization activity.

Clause 25. The process of any one of the preceding Clauses, wherein the process further comprises the step of pretreating the molecular sieve membrane to minimize acidity of the molecular sieve membrane.

Clause 26. The process of any one of the preceding Clauses, wherein the permeate has a volume between about 65 vol % and about 75 vol % of a clean Group I, Group II, or Group III lube base stock and the retentate has a volume between about 25 vol % and about 35 vol % of the clean Group I, Group II, or Group III lube base stock.

Clause 27. The process of any one of the preceding Clauses, wherein the permeate comprises paraffins in a volumetric amount of about 45 vol % of the clean Group I, Group II, or Group III lube base stock and comprises 1-ring naphthene in a volumetric amount of about 25 vol % of the clean Group I, Group II, or Group III lube base stock and the retentate comprises multi-ring naphthene and mono-aromatics in a volumetric amount of about 30 vol % of the clean Group I, Group II, or Group III lube base stock.

Clause 28. The process of any one of the preceding Clauses, wherein the permeate has good oxidative stability when blended with anti-oxidants and other additives, as determined by Sequence III-G automotive engine oil testing and the Turbine Oil Oxidation Stability Test.

The present invention has been described above with reference to numerous embodiments and specific examples. Many variations will suggest themselves to those skilled in this art in light of the above detailed description. All such obvious variations are within the full intended scope of the appended claims.

All numerical values within the detailed description and the claims can modified by "about" or "approximately" the indicated value, taking into account experimental error and variations.

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited. Additionally, within a range includes every point or individual value between its end points even though not explicitly recited. Thus, every point or individual value can serve as its own lower or upper limit combined with any other point or individual value or any other lower or upper limit, to recite a range not explicitly recited.

What is claimed is:

1. A process for separating paraffins in a hydrotreated hydrocarbon stream comprising the steps of:
   providing a hydrotreated hydrocarbon stream comprising paraffins, aromatics and/or other multi-ring hydrocarbon compounds;
   contacting the hydrotreated hydrocarbon stream with a molecular sieve membrane; and
   separating the paraffins to provide a wax product feed stream, and a stream of fuel or lube by-products, wherein solvent is not used in the separation process,
   wherein the molecular sieve membrane comprises:
      one or more layers of size-selective catalyst wherein the size-selective catalyst comprises a crystal structure of ZSM48 and/or mordenite, wherein each layer of size-selective catalyst has a plurality of perpendicular membrane channels and a plurality of opening pores, and wherein the perpendicular membrane channels are perpendicular to a direction of flow of the hydrotreated hydrocarbon stream, and
      wherein the plurality of perpendicular membrane channels is in fluidic communication with the plurality of opening pores; and a porous support comprising a plurality of diffusing gaps, wherein the porous support is in fluidic communication with the plurality of opening pores providing a fluidic pathway between the perpendicular membrane channels and the diffusing gaps, and the molecular sieve membrane is configured for cross-flow of the hydrotreated hydrocarbon stream over the molecular sieve membrane causing a continuous flow of a permeate comprising the wax product feed stream into the perpendicular membrane channels through the plurality of opening pores into and out of the diffusing gaps of the porous support.

2. The process of claim 1, wherein the wax product stream comprises paraffins, 1-ring naphthenes, and ringed aromatics and the lube by-product stream comprises multi-ring naphthenes.

3. The process of claim 1, wherein the hydrotreated hydrocarbon stream comprises Group II+base stock.

4. The process of claim 1, wherein the permeate or retentate comprises a Group III+base stock.

5. The process of claim 1, wherein the process is carried out in blocked mode operation.

6. The process of claim 1, wherein the process further comprises the step of pretreating the molecular sieve membrane to minimize acidity of the molecular sieve membrane.

7. The process of claim 1, wherein the hydrotreated hydrocarbon stream comprises at least one of a Group I, Group II, or Group III lube base stock, wherein the permeate has a volume between about 65 vol % and about 75 vol % of the hydrotreated hydrocarbon stream and wherein the process further comprises forming a retentate having a volume between about 25 vol % and about 35 vol % of the hydrotreated hydrocarbon stream.

8. The process of claim 1, wherein the hydrotreated hydrocarbon stream comprises at least one of a Group I, Group II, or Group III lube base stock, wherein the permeate comprises paraffins in a volumetric amount of about 45 vol % and 1-ring naphthene in a volumetric amount of about 25 vol % of the hydrotreated hydrocarbon stream and wherein the process further comprises forming a retentate comprising multi-ring naphthene and mono-aromatics in a volumetric amount of about 30 vol % of the hydrotreated hydrocarbon stream.

9. The process of claim 1, wherein the porous support comprises graphite, clays and/or two-dimensional ionic conductors.

10. The process of claim 1, wherein the porous support is a single layer.

11. The process of claim 1, wherein the porous support is a coating.

12. The process of claim 1, wherein each of the perpendicular membrane channels is between about 4 Angstroms to about 10 Angstroms.

13. The process of claim 1, wherein each of the perpendicular membrane channels is between about 4 Angstroms to about 8 Angstroms.

14. The process of claim 1, wherein each of the perpendicular membrane channels is between about 4 Angstroms to about 6 Angstroms.

15. The process of claim 1, wherein the molecular sieve membrane is not acidic as determined by titration, ammonia adsorption, pyridine adsorption, or a combination thereof.

16. The process of claim 1, wherein the membrane is tubular.

17. The process of claim 1, wherein the molecular sieve membrane is configured to separate wax from lube oil.

18. The process of claim 1, wherein the membrane channels are two dimensional in shape.

19. A process for separating paraffins in a hydrotreated hydrocarbon stream comprising the steps of:
   providing a hydrotreated hydrocarbon stream comprising Group II base stock;
   contacting the hydrotreated hydrocarbon stream with a molecular sieve membrane; and
   separating the Group II base stock to provide a Group III base stock, and a stream of fuel or lube by-products, wherein solvent is not used in the separation process, wherein the molecular sieve membrane comprises:
one or more layers of size-selective catalyst, each layer of size-selective catalyst having a plurality of perpendicular membrane channels and a plurality of opening pores, wherein the perpendicular membrane channels are perpendicular to a direction of flow of the hydrotreated hydrocarbon stream and wherein the size-selective catalyst comprises a crystal structure of ZSM48 and/or mordenite, and wherein the plurality of perpendicular membrane channels is in fluidic communication with the plurality of opening pores; and a porous support comprising a plurality of diffusing gaps, wherein the porous support is in fluidic communication with the plurality of opening pores providing a fluidic pathway between the perpendicular membrane channels and the diffusing gaps, and the molecular sieve membrane is configured for cross-flow of the hydrotreated hydrocarbon stream over the molecular sieve membrane causing a continuous flow of a permeate comprising the wax product feed stream into the perpendicular membrane channels through the plurality of opening pores into and out of the diffusing gaps of the porous support.

* * * * *